June 21, 1949. A. Y. WARNER ET AL 2,473,554
QUICK-RELEASE CONNECTOR FOR STRAPS AND THE LIKE
Filed Jan. 2, 1947 2 Sheets-Sheet 1
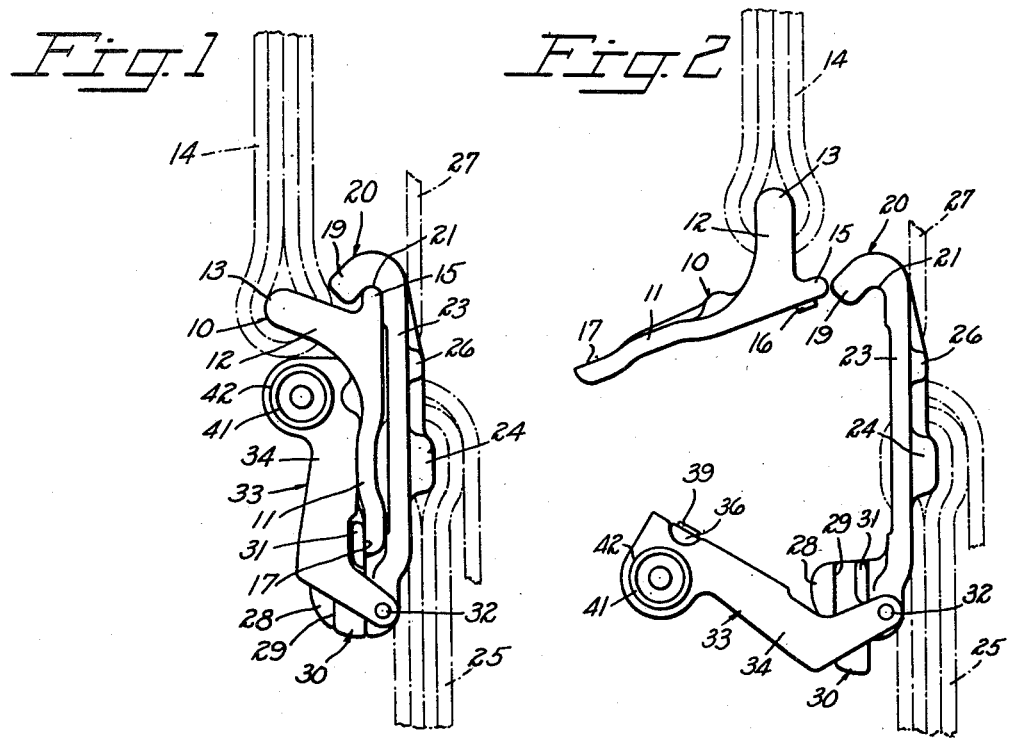
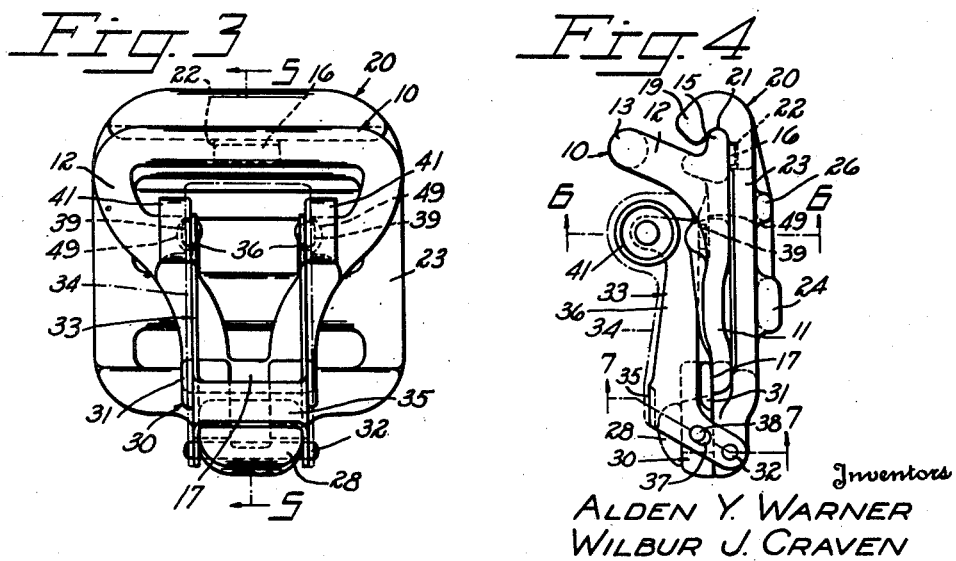
Inventors
ALDEN Y. WARNER
WILBUR J. CRAVEN June 21, 1949.  A. Y. WARNER ET AL  2,473,554
QUICK-RELEASE CONNECTOR FOR STRAPS AND THE LIKE
Filed Jan. 2, 1947  2 Sheets-Sheet 2
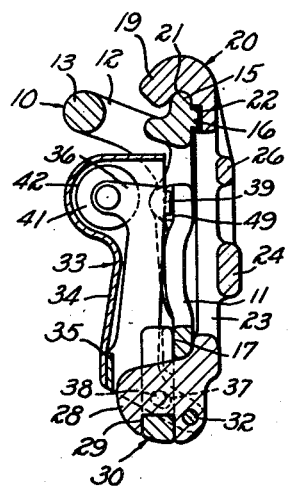
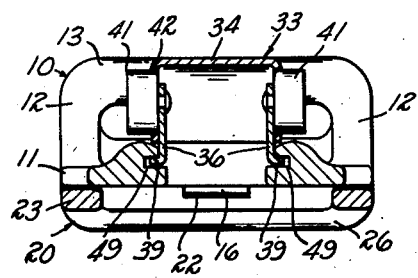
Inventors
ALDEN Y. WARNER
WILBUR J. CRAVEN
By Clay Lindsey
Attorney Patented June 21, 1949

2,473,554

UNITED STATES PATENT OFFICE 2,473,554

QUICK-RELEASE CONNECTOR FOR STRAPS AND THE LIKE

Alden Y. Warner, Farmington, and Wilbur J. Craven, East Hartford, Conn., assignors to The Capewell Manufacturing Company, Hartford, Conn., a corporation of Connecticut Application January 2, 1947, Serial No. 719,848

13 Claims. (Cl. 24—201)

1

The present invention relates to quick release connectors and has particular advantage for use with parachute harness, the same having particular utility as a canopy release.

It is an object of the present invention to provide a quick-releasing connector which is of sufficiently strong construction to withstand relatively strong tensions such as are encountered when a parachute canopy is opened, which connector is constructed so that it will not be accidentally released, and yet which is so arranged that it can be easily and quickly released without loss of time and with a minimum of effort, when desired, without jamming and even though the device is under relatively heavy tension.

It is a further object of the invention to provide a quick release connector which not only accomplishes the above named object under most favorable operating conditions, but which can be relied upon to be effective under any adverse conditions of operation. In keeping with this object, it is an aim to provide a quick release connector which is not dependent upon springs for its action, which can be made corrosion resistant and which will not become fouled by dirt, dust, moisture and the like.

At the same time, it is an aim of the invention to provide a device having the characteristics mentioned above, which device is free of projections or edges which might cause snagging or cutting of the associated apparatus, which is effective regardless of the direction in which force is applied thereto, which cannot be assembled improperly, which is composed of interchangeable parts and which is not readily susceptible to breakage or malfunctioning under the most adverse conditions.

In accomplishing the above objections it is a further aim of the invention to provide a device which is of small size and of a light weight and a device which can be easily secured to harness or other straps or other linkages which are of relatively large size and which are sometimes utilized in double thickness. It is also intended to provide a device which is so constructed that the possibility of injury to the user will be kept at a minimum.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

2

In the drawings—

Figure 1 is a side view of a specific embodiment of the invention, showing the connector in assembled position;

Fig. 2 also is a side view and shows the elements of the connector in separated position;

Fig. 3 is a top view of the assembled device with certain of the elements shown in dash lines removed;

Fig. 4 is a side view corresponding to Fig. 3;

Fig. 5 is a cross sectional view taken along the line 5—5 of Fig. 3;

Fig. 6 is a cross sectional view taken along the line 6—6 of Fig. 4; and

Fig. 7 is a cross sectional view taken along the line 7—7 of Fig. 4.

Referring to the drawings, the specific embodiment of the invention is shown as comprising two separate units 10 and 20 which, as described below, are adapted to be interconnected to form a coupling as, for example, between the canopy and the main sling of a parachute harness and which are adapted to be instantaneously separated by a minimum effort on the part of the user.

The connector unit 20 which, for convenience, will be referred to hereinafter as the "lower unit" comprises a plate or base 23 formed at one end with a flange 19 which forms an inwardly facing bearing 21 generally inwardly curved in cross section and in the nature of a groove extending transversely across the inner face of the flange 19. The opposite end of the base or plate 23 is formed with a shoulder 28 on which is mounted latch means 30 as described more particularly hereinafter. The upper surface of the connector unit 20 extending between the shoulder 28 and the flange 19 forms a seat upon which is adapted to rest the lower surface of the connector unit 10 which, for convenience, will be referred to hereinafter as the "upper unit." The upper unit 10 has one edge 15 adapted to pivotally engage the inwardly facing bearing 21 on the flange 19. The opposite end of the connector unit 10 is formed with a flattened toe portion 17 which is adapted to be engaged by the latch 30 as described hereinafter.

The upper connector unit 10 is adapted to be connected to a strap such as the double strap 14 shown in dot and dash lines in the drawing which, for example, may be connected to the shroud or canopy lines (not shown) of a parachute. The attachment to the strap may be made by means of the cross bar 13 which is spaced upwardly and outwardly from the plane of the base 11 of the connector unit 10 by means of the upwardly extending arms 12 which are located adjacent the edge 15 of the base of the connector unit 10. The double thickness strap around the cross bar 13 in the embodiment illustrated in the drawings, acts as a cushion in the event the connector should strike the user.

The arrangement of the parts described is such that, when the forward toe end 17 of the base 11 is released by the latch 30, the tension exerted by the canopy and applied to the cross bar 13 will cause the connector unit 10 to pivot around the flanged end 19 of the connector unit 20, thus moving the connector unit 10 to the released position shown in Fig. 2.

The base of the connector unit 20 is formed with a cross bar 24 which is adapted to receive the doubled end of a strap 25 as shown in dot and dash lines in Figs. 1 and 2, or other linkages which strap, for example, may be the main sling of a parachute harness. Here again, the double thickness of the strap is so located as to materially decrease the possibility of injury to the user. A second cross bar 26 (or as many as the type of linkage or use may require) is provided for receiving a second strap 27 also shown in dot and dash lines, which, for example, may be the adjusting strap of a parachute harness. A lug 16 on the upper unit 10 and a notch 22 in the lower unit 20 cooperate to properly position the units 10 and 20 laterally with respect to each other and also to form an additional interlock which enables the device to withstand tensions which are not applied in direct line with the units themselves, such as when the straps 14 and 25 extend at an angle to each other.

At the end of the base 23 opposite from the curved flange 19 there is formed a T-shaped shoulder 28, as previously mentioned, forming spaced channelways 29 adapted to slidably receive the U-shaped locking slide 30 referred to above as the latch means. The U-shaped locking slide 30 is provided with lateral extensions 31 for increasing the area of its surface engaging the flat upper surface 17 of the base 11 when the slide is in a forward locking position, as shown in Fig. 4.

Pivoted to the base plate 23 adjacent the T-shaped shoulder 28 by means of a pin 32 is an actuating lever 33 which is adapted to be pivoted between the closed and open positions shown in Figs. 1 and 2 respectively. In the closed position, the lever 33 closely overlies the base 11 of the connector unit 10 when the device is assembled. The lever 33 comprises a cover member 34 and a laterally resilient bifurcated locking lever 35 both pivoted on the pin 32 and extending around the T-shaped shoulder 28. The bifurcated lever 35 forms two laterally resilient and flexible spaced arms 36 extending along the inner portion of the cover member 34 and terminating in buttons 41 extending laterally outwardly through concentric openings 42 in the cover member 34. The opposite end of lever 35 is formed with elongated openings 37 adapted to slidably receive pins 38 extending outwardly from the locking slide 30. As a result of this construction, it will be readily seen that the locking slide 30 may be caused to slide from locking to unlocking position merely by pivoting the actuating lever 33 from the position shown in Fig. 1 to the position shown in Fig. 2.

The actuating lever 33 is adapted to be releasably held in the locking position shown in Fig. 4 by means of projections or ears 39 on the ends of the flexible arms 36 which are adapted to engage in slots 49 formed in the interior surface of the base 11, as shown more clearly in Fig. 6. By pressing inwardly on the buttons 41 as by grasping them between the forefinger and thumb, therefore, it is a simple procedure to release the ears 39 from the slots 49 whereupon the actuating lever 33 is free to be pivoted upwardly away from the base 11 to the position shown in Fig. 2. This causes the locking slide 30 to be moved outwardly to the unlocking position shown in Fig. 2 where it no longer engages the flat upper surface 17 of the base 11, whereupon the base 11 is free to pivot around the curved flange 19 of the connector unit 20 thus releasing the connection between the canopy and the harness.

From the above description and explanation, it will be seen that the connector units 10 and 20 are held in interconnected position when their bases 11 and 23 are held parallel by means of the locking slide 30, and that any tensions exerted by the connecting straps results in a force transverse to the plane of movement of the locking slide 30. Accordingly, none of this force acts to unlock the units. As a result of this construction, it is readily possible to form, for example, a connector of small size and weight which will be safe for use with such loads as may be encountered in the use of parachutes, such as tensions of the order of 5,000 pounds. By other combinations of sizes and weights, of course, it is possible to accommodate safely greater or lesser tensions.

Inasmuch as the forces exerted on the connector react against the slide 30 transversely which transmits these forces from the base 11 to the base 23 through the T-shaped shoulder 28, there is no jamming of the actuating lever 33 so that a relatively light pressure on the buttons 41 will suffice to release the ears 39 from the slots 49. However, since both buttons must be simultaneously actuated to release the lever 33 and they are actuated in opposite directions, it is unlikely that the actuating lever 33 and locking slide 30 would be accidentally released.

Following the release of the ears 39 from the slots 49 by pressure on the buttons 41, it is relatively simple to pivot the lever 33 to the open position shown in Fig. 2 thereby withdrawing the locking slide 30 from its former locking position over the flat upper surface 17. Pivoting movement of the locking slide 30 may be frictionally interfered with to some extent by the pressure on the locking slide 30 from the base 11 but by reason of the substantial leverage obtained in the construction shown (the length of the lever 33 as compared to the distance between the pins 32 and 38) the force required can readily be provided by even a relatively weak person even though the canopy is exerting a tension of as high as 250 pounds.

It will be observed that the device is of relatively simple design and can be easily manufactured and assembled with interchangeable parts. At the same time, the outer surfaces of the connector may be given a smooth finish and may be plated to withstand corrosion if not made of materials which are corrosion resistant in themselves, and the device is so rounded that there are no projections or sharp edges which would have a cutting or snagging effect. Moreover, the moving parts are so constructed and arranged that jamming or cramping due to dirt or the like being caught therein is avoided.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

We claim as our invention:

1. A quick release connector comprising two separable units, the first of said units comprising a base provided with strap attaching means and having an inwardly facing bearing at one end, the second of said units having a base adapted to seat on the base of the first unit with one end pivotally engaging the said bearing thereof, said second unit having strap attaching means spaced from the plane of its base and adjacent the pivoted end, locking means on the first unit spaced from said bearing and adapted to engage the second unit to prevent relative pivoting of said units at said bearing, and manually operable means for actuating said engaging means.

2. A quick release connector comprising two separable units, the first of said units comprising a base provided with strap attaching means and having a flanged end portion having a bearing groove, the second of said units having a base adapted to seat on the base of the first unit with one end pivotally engaging in the said bearing groove, said second unit having strap attaching means spaced from the plane of its base and adjacent the pivoted end, an operating lever pivotally mounted on the first unit and adapted to be pivoted to a position overlying said bases, locking means controlled by said operating lever for preventing pivoting of said units when the operating lever is pivoted to said overlying position, and means for releasably securing the operating lever in said overlying position.

3. A quick release connector comprising a pair of interlocking units constructed and arranged to separate by pivoting of the first unit relative to the second unit, strap fastening means on each of said units whereby tensions applied thereto will tend to cause the first unit to pivot with respect to the second unit and thus cause them to release, a latch on one of the units adapted to engage the other unit to prevent relative pivoting thereof, and a lever arm pivotally mounted on said one unit for actuating the latch.

4. A quick release connector comprising a pair of interlocking units constructed and arranged to separate by pivoting of the first unit relative to the second unit, strap fastening means on each of said units whereby tensions applied thereto will tend to cause the first unit to pivot relative to the second unit and thus cause them to release, a stop member movably mounted on one of the units and adapted to be moved into and out of position for obstructing relative pivoting of said units, a pivotally mounted actuating lever for moving said stop member into and out of obstructing position, and means for releasably retaining the actuating lever in the pivoted position where the stop member is moved to obstructing position.

5. A quick release connector comprising two separable units, the first of said units comprising a base provided with strap attaching means and having an inwardly facing recessed bearing at one end and locking means at the other end, the second of said units having a base adapted to be interlocked with the first unit between the bearing portion and the locking means and having strap attaching means spaced from the plane thereof, an actuating arm pivotally mounted on the base of the first unit for locking and unlocking said locking means, and releasable means for retaining the actuating arm in locking position.

6. A quick release connector comprising a pair of separable units, the first of said units having a base provided with strap attaching means and a flanged end portion forming an inwardly facing recessed bearing, the second of said units having a base adapted to seat on the base of the first unit and with one end pivotally received in said bearing, a strap connector on the second unit spaced from the plane of that unit, a locking slide slidably mounted on the first unit and adapted to slide into and out of locking position overlying the base of the second unit to prevent pivoting thereof, a lever arm pivotally mounted on the first unit and adapted to pivot to a position overlying the said bases, said lever arm being interconnected with said slide to move same to locking position when the arm is pivoted to said overlying position and to move same to unlocking position when the arm is pivoted away from said overlying position, and means for releasably retaining the lever arm in said overlying position.

7. A quick release connector comprising a pair of separable units, the first of said units having a base provided with strap attaching means and an inwardly facing curved bearing surface, the second of said units having a base with a heel adapted to be pivotally received within said curved end, a strap connector on the second unit spaced from the plane of the base of that unit, a locking member slidably mounted on the first unit and spaced from the curved end thereof, said locking member being adapted to be slid to a locking position extending over the free end of the second unit and prevent pivoting thereof, a lever arm pivotally mounted adjacent the locking member for actuating same and adapted when pivoted to a position overlying said bases to slide the locking member to locking position, and means for releasably retaining the lever arm in said overlying position.

8. A quick release connector comprising two separable units, one of said units comprising a base having a curved end portion forming a bearing, and the second of said units having a base adapted to seat on the base of the first unit with one end pivotally engaging in said bearing, a locking slide mounted on the first unit operative in one position to prevent separation of the opposite ends of said bases, an actuating lever pivotally mounted on the first unit adapted to move the locking slide into and out of locking position, and manually releasable means for retaining the actuating lever in locking position.

9. A quick release connector comprising a pair of separable units, one of said units comprising strap attaching means and a base spaced therefrom having an edge about which the unit is adapted to pivot, the second of said units comprising a member provided with strap attaching means and having a curved flange forming a seat for said edge, a lever operated interlock for preventing relative pivoting of said units, and means for releasably retaining the lever in locking position.

10. A quick release connector comprising a pair of separable units, the first of said units comprising a base provided with strap attaching means and having a shoulder at one end and an inwardly facing bearing flange at the other end, the second of said units being generally angular in cross section to form a base adapted to be closely positioned between the ends of said first unit but releasable therefrom by pivoting around the bearing flange and an arm projecting outwardly therefrom for attachment to a second strap, a slide mounted on the shoulder adapted to be slid to and from a position overlying the adjacent end of the base of the second unit to prevent pivoting thereof, an actuating arm pivotally mounted on the shoulder for moving said slide into and out of said overlying position, and releasable means for retaining the actuating arm in locking position.

11. A quick release connector comprising a pair of separable units, the first of said units comprising a base having a shoulder at one end and an inwardly facing curved bearing surface at the other end, the second of said units having a base adapted to fit between the shoulder and curved bearing surface of the first unit and to be separable therefrom only by pivoting around said curved bearing surface, a locking slide mounted on the shoulder adapted to be moved to and from a position engaging the adjacent end of the base of the second unit, an actuating arm pivotally mounted on the shoulder adapted to be pivoted to and from a position overlying said bases, a driving connection between said slide and arm whereby the slide is moved to locking position when the arm is pivoted to said overlying position, and manually operable latch means for releasably interlocking the arm and the base of the second unit.

12. A quick release connector comprising a pair of separable units, the first of said units comprising a base having a shoulder at one end and an inwardly facing curved bearing surface at the other end, the second of said units having a base adapted to fit between the shoulder and curved bearing surface of the first unit and to be separable therefrom only by pivoting around said curved surface, a locking slide mounted on the shoulder adapted to be moved to and from a position engaging the adjacent end of the base of the second unit, an actuating arm pivotally mounted on the shoulder adapted to be pivoted to and from a position overlying said bases, a driving connection between said slide and arm whereby the slide is moved to locking position when the arm is pivoted to said overlying position, said arm comprising a pair of spaced arms which are laterally flexible and resilient, means whereby said arms may be manually flexed, and projections on the ends of said arms adapted to be engaged in slots in the base of the second unit.

13. A quick release connector comprising a pair of separable units, the first of said units comprising a base having a shoulder at one end and an inwardly facing curved bearing surface at the other end, the second of said units having a base adapted to fit between the shoulder and curved bearing surface of the first unit and to be separable therefrom only by pivoting around said curved surface, a lug on the base of the second unit adapted to be received in a notch in the base of the first unit to prevent relative lateral movements thereof, a locking slide mounted on the shoulder adapted to be moved to and from a position engaging the adjacent end of the base of the second unit, an actuating arm pivotally mounted on the shoulder adapted to be pivoted to and from a position overlying said bases, a driving connection between said slide and arm whereby the slide is moved to locking position when the arm is pivoted to said overlying position, and manually operable latch means for releasably interlocking the arm and the base of the second unit.

ALDEN Y. WARNER.
WILBUR J. CRAVEN.

REFERENCES CITED

The following references are of record in the file of this patent:

UNITED STATES PATENTS

| Number | Name | Date |
|---|---|---|
| 1,193,135 | Gerstner et al. | Aug. 1, 1916 |
| 1,980,222 | Ogush | Nov. 13, 1934 |

FOREIGN PATENTS

| Number | Country | Date |
|---|---|---|
| 728,533 | France | Apr. 12, 1932 |